July 4, 1933.   F. H. ROWE   1,916,895
WINDSHIELD HEATER
Filed July 1, 1929
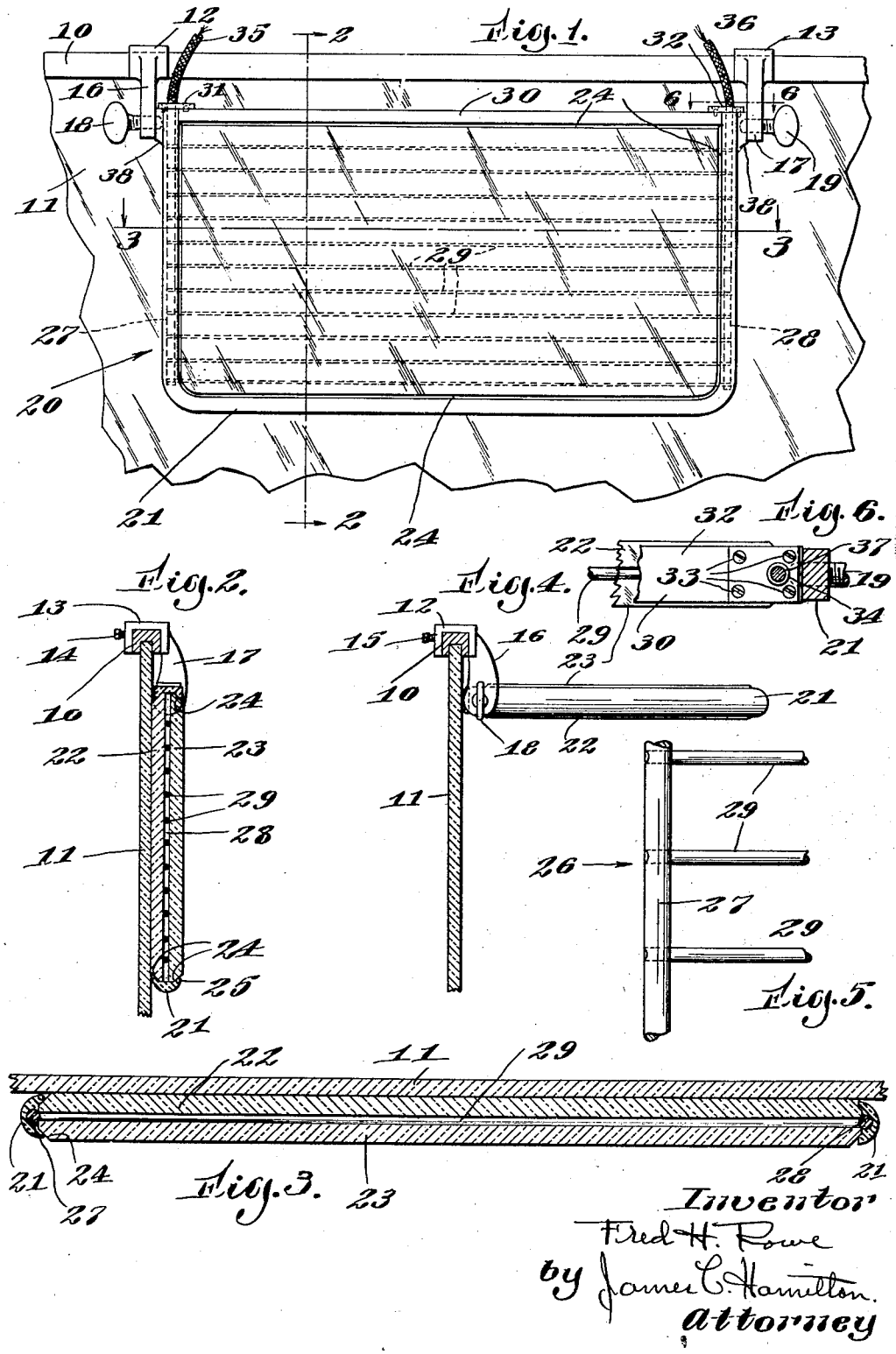

Patented July 4, 1933

1,916,895

UNITED STATES PATENT OFFICE

FRED H. ROWE, OF GLOUCESTER, MASSACHUSETTS

WINDSHIELD HEATER

Application filed July 1, 1929. Serial No. 375,111.

My present invention relates to windshield heaters, and more particularly to an improved windshield heater in the form of a heated flap of glass bearing directly upon the glass of the windshield from within a vehicle such as an automobile.

It is a well known fact that much danger and difficulty is encountered in driving automobiles in cold weather, snow storms and the like, due to accumulation of ice or snow on the outside of the windshield; also another factor with similar results is moisture collecting upon the inside of the windshield under certain atmospheric conditions rendering the driving of such vehicles dangerous.

Having the above difficulties in view, I have invented an attachment which may be applied to the inside surface of windshields which can be electrically heated from any local source such as the automobile battery, generator or the like, which will lie against the inner surface of the windshield in the manner of a hot pad when in use, or tipped up out of the way when not in use.

The principal object, therefore, of my invention, is an improved heater for windshields and the like.

Another object is an electrical windshield heater which has actual contact with the windshield, but at the same time will not impair the vision therethrough to any practical extent.

Other objects and novel features comprising the construction and operation of my device will appear as the description of the invention progresses.

In the drawing illustrating the principle of my invention:

Fig. 1 is an inside elevation of a windshield with my heater in operation;

Fig. 2 is a cross section taken on the line 2—2 of Fig. 1;

Fig. 3 is a longitudinal cross section taken on the line 3—3 of Fig. 1;

Fig. 4 is a cross section similar to Fig. 2, but showing the heater raised as in the non-operating position;

Fig. 5 is a fragmentary detail of the heating elements, and

Fig. 6 is a cross sectional detail of one end of the heater taken on the line 6—6 of Fig. 1.

Referring to the drawing, 10 indicates a windshield frame in which the windshield glass 11 is carried. Offset clamp brackets 12 and 13 are secured to the windshield frame 10 in any suitable manner such as set screws 14 and 15, threaded in the brackets 12 and 13; the free offset sides 16 and 17 of the brackets 12 and 13 repsectively, are adapted to receive thumb screws 18 and 19 for the purpose of clamping the flap member 20 in an open or closed position.

The flap 20 is composed of a U shaped frame 21 made from a relatively solid insulating material surrounding on three sides, two glass plates 22 and 23 the edges of which are beveled at 24 and which engage with overlapping edges 25 located on the U frame 21 for the purpose of retention within the said U frame 21. A heater element 26 is composed of two vertical feed lines 27 and 28 located at either end of the U frame and adjacent the inner end edges of the two glass members 22 and 23, and longitudinally disposed resistance wires 29 arranged in parallel formation are imbedded in the feed members 26 and 27 by any suitable method such as welding, the resistance wires 29 being located between the two glass plates 22 and 23 clearly shown in Figs. 2 and 3.

In assembling the flap 20, the resistance unit 26 is placed between the glass plates 22 and 23 after which the two are slid into the U member 21 and a straight top member 30 having a cross-section corresponding to the U member is fitted down over the top, and plates 31 and 32 are then attached to the flat strip 30 and the ends of the U member 21 by means of screws 33, an opening 34 being provided therein for the entrance of wires 35 and 36 for the purpose of attaching to the heat unit 26, an insulating eyelet 37 is provided in the opening 34 to insulate the lead wires 35 and 36 from the plates 31 and 32 which are preferably made from metal.

A boss 38 is formed of either top end of the U member 21 for the purpose of receiving the thumb screws 18 and 19 threaded in the brackets 16 and 17 respectively.

In operation, the flap unit 20 is dropped down in contact with the windshield glass 11 and maintained in contact thereto by the screws 18 and 19, electrical current is supplied to the heater unit 27 by a suitable switch located at any convenient place in the vehicle and the glass 22 and 23 is maintained at any desired degree of heat consistent with its use. The heat generated from the glass 22 and 23 is transmitted by contact to the glass 11 of the windshield thereby preventing the formation of ice on the outside of the windshield glass 11 or moisture on the inside in the immediate vicinity of the windshield covered by the flap 20.

The resistance wires 29 are very small being no larger than a horse hair or even smaller, and unless the eye of the operator is intentionally focussed upon them they will hardly be noticeable, the spacing of these wires 29 is relatively far apart, as for instance 1½" to 2".

Having thus described my invention, what I claim as new, is:

A windshield heater comprising in combination two oppositely bevelled glass plates separated by an electrical heater unit, a frame adapted to partly overlap the bevelled portions of said glass plates and support and hold said plates and heater unit, and brackets adapted to attach said frame to a windshield.

In testimony whereof I have affixed my signature.

FRED H. ROWE.